United States Patent [19]

Beauchamp

[11] Patent Number: 5,552,933
[45] Date of Patent: Sep. 3, 1996

[54] VISIBLE LIGHT REFLECTORS AND PROCESS OF MAKING SAME

[76] Inventor: Jeanne S. Beauchamp, 10337 Azuaga St., #222, San Diego, Calif. 92129

[21] Appl. No.: 228,930

[22] Filed: Apr. 18, 1994

Related U.S. Application Data

[63] Continuation-in-part of Ser. No. 985,667, Dec. 3, 1992, abandoned.

[51] Int. Cl.$^6$ ............................................. G02B 5/12
[52] U.S. Cl. .................. 359/515; 359/516; 359/534; 359/900; 264/1.9; 428/913.3
[58] Field of Search ................. 359/515–527, 359/534–536, 543–545, 549–550, 900, 487–488, 492, 501, 502; 264/1.7, 1.9, 73, 80; 40/208, 582–583; 428/542.2, 542.6, 913.3

[56] References Cited

U.S. PATENT DOCUMENTS

| | | |
|---|---|---|
| 285,125 | 9/1883 | Hamann . |
| 1,241,467 | 9/1917 | Hastings . |
| 2,306,587 | 10/1938 | Broderson . |
| 2,602,192 | 4/1948 | Silberkraus . |
| 3,871,336 | 3/1975 | Bergman ............................ 359/516 |
| 3,901,579 | 8/1975 | Demerest ........................... 359/519 |

*Primary Examiner*—James Phan
*Attorney, Agent, or Firm*—Thomas J. Tighe

[57] ABSTRACT

Light reflective buttons according to this invention are made from a plurality of fused strata, the top stratum having an exposed reflective area, preferably of pleochroic or dichroic material in a plane. Manufacture of the buttons involves stacking the top stratum with the reflective area exposed on top of a sub-stratum, and then heating the complex to a temperature sufficient to fuse the stack. During fusion, the stack forms a dome with a flat base. Sub-strata may be added to the stack as needed prior to heating for strength and/or aesthetic purposes. Preferably the strata are all glass, with the top stratum being a cut or otherwise shaped piece of sheet glass commonly known as "dichroic glass." For a reflective area comprised of a plane of pleochroic or dichroic crystalline material, the temperature at which fusion of the strata occurs is too low to melt the crystalline plane, and so it is substantially unaffected by the heating. Thus, the reflective area holds its shape and may be incorporated into the button in whatever form is desired. Along with decorative uses, these buttons may be used as safety reflectors mounted on objects or clothing worn by persons or animals.

22 Claims, 2 Drawing Sheets

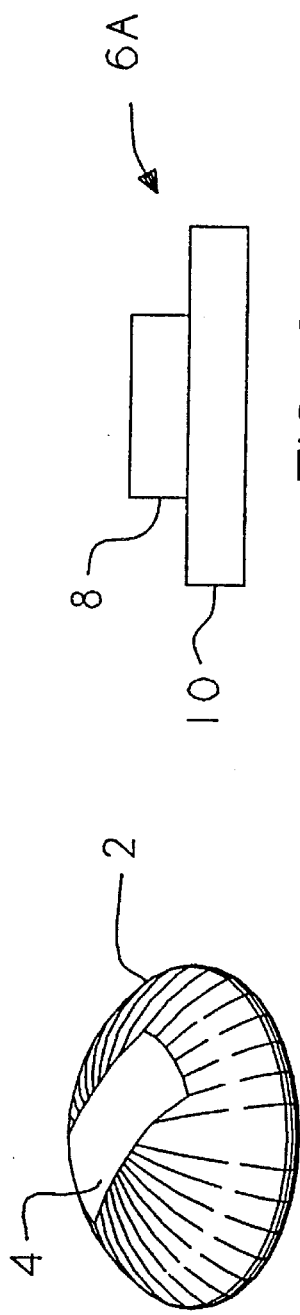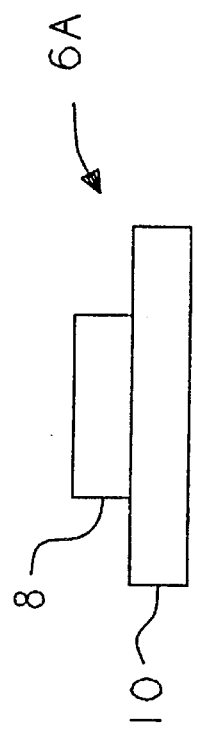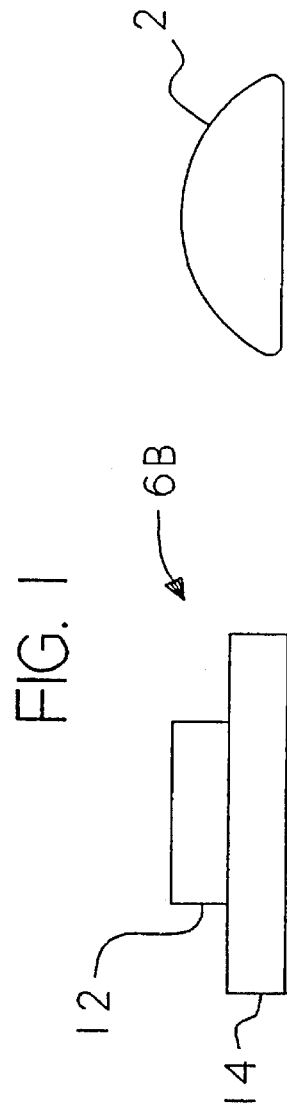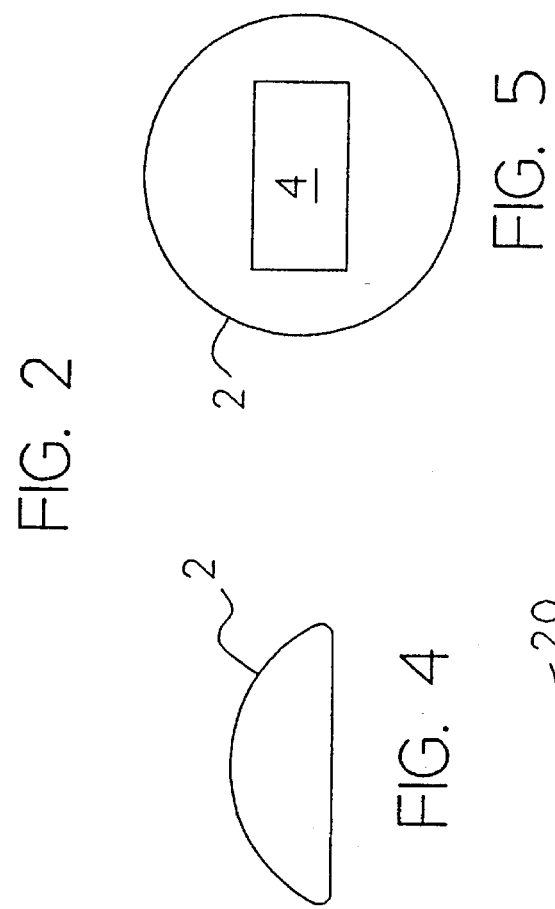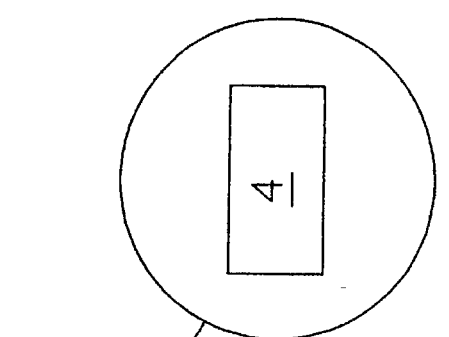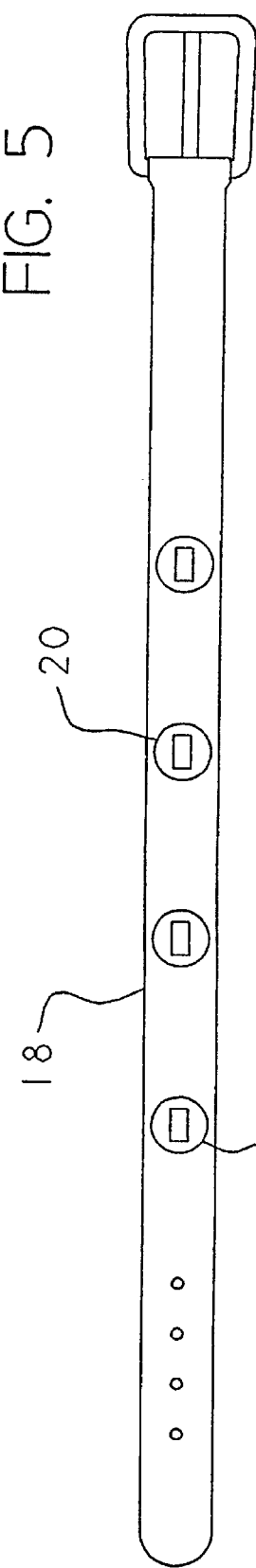

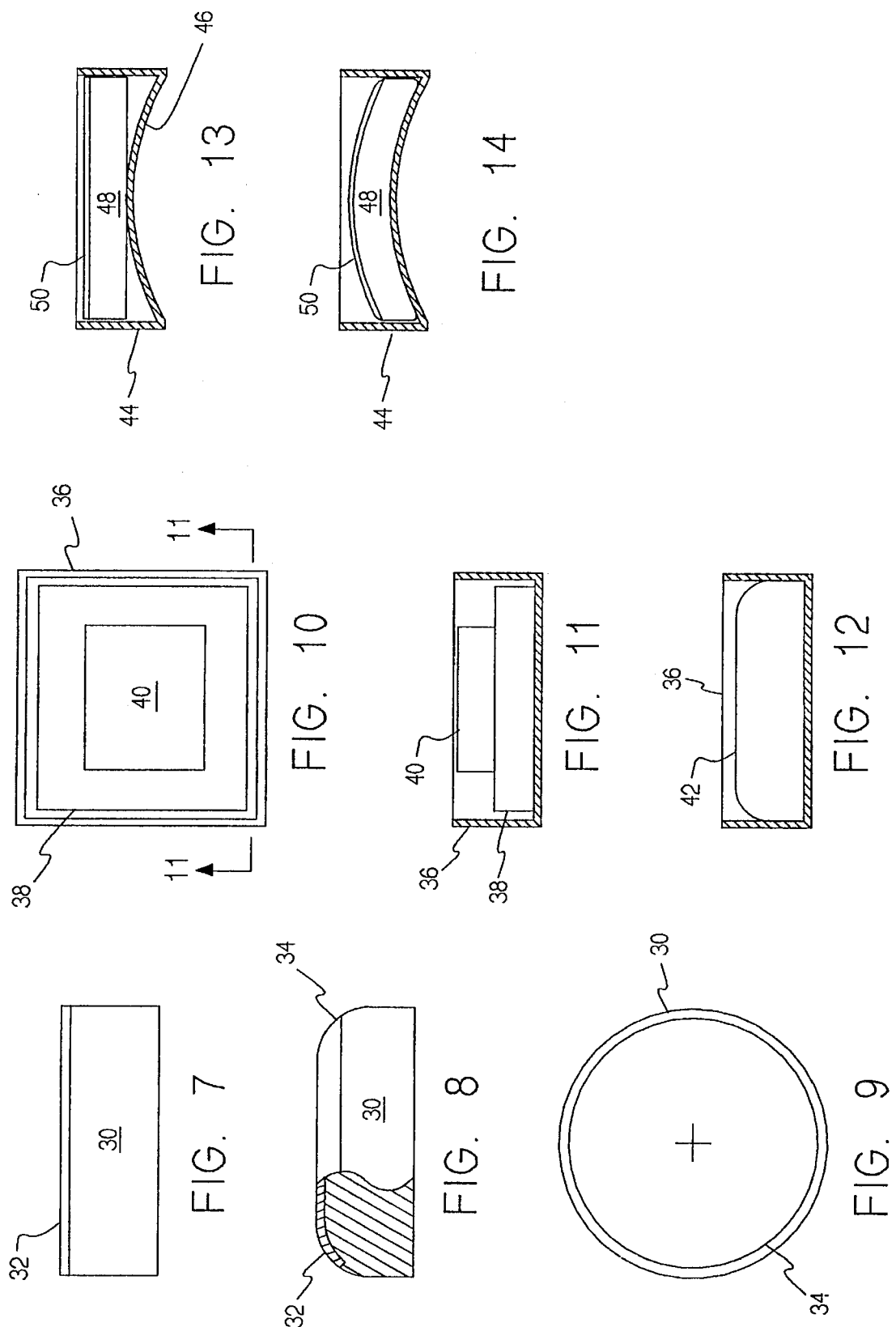

VISIBLE LIGHT REFLECTORS AND PROCESS OF MAKING SAME

This is a Continuation-In-Part of application Ser. No. 07/985,667 filed Dec. 3, 1992, now abandoned.

FIELD OF THE INVENTION

This invention relates to the manufacture and use of button-like visible light reflectors for mounting on the surface of an object to make the object more light reflective, particularly for collision avoidance, and more aesthetically pleasing, and in particular to reflectors in the form of solid domes, if any, incorporating dorsal pleochroic or dichroic planes that reflect hues or colors high in lightness and processes for their manufacture.

BACKGROUND OF THE INVENTION

Every year thousands of pets and human beings are struck by motor vehicles due to poor visibility in darkness. Though automobile headlights are designed to provide ample illumination, their effectiveness may be limited by diffusion, incorrect adjustment or adverse weather. Such conditions, or simply excessive speed, may make it impossible to avoid an animal or person by the time they are within the normal range of the headlight beam. However, the use of reflective materials can greatly extend the range of illumination as well as the corresponding reaction time. By mounting light reflectors at locations which are easily visible, any object may be rendered reflective and easier to see in low light conditions. For example, mounting reflectors on collars worn by animals will make them more visible in darkness to on-coming vehicles with headlights.

An advantage of a process of this invention is that such reflectors can be made quickly, inexpensively and requiring a relatively low amount of production technology and labor. A further advantage of the process is that such reflectors can be made of high quality with a uniform shape and smooth texture, and can be made to possess aesthetically pleasing optical properties of pleochroic or dichroic materials. It is also advantageous that such reflectors be made mechanically strong and durable.

Other advantages and attributes of this invention will be readily discernable upon a reading of the text hereinafter.

PRIOR ART

The beneficial physical properties of glass, combined with its aesthetic value, have long made it a favorite working material among craftsmen. U.S. Pat. No. 285,125 (Hamann) discloses the manufacture of glass buttons using a metallic cross piece as a means for attaching it to the garment. This cross piece is embedded while the glass or other material is still in a liquid state and becomes permanently affixed as the material cools. In addition, FIGS. 5–8 describe a two part glass button wherein the wire is embedded in one part and the second piece is cemented to construct the complete button.

Another process for manufacturing buttons was disclosed in U.S. Pat. No. 1,241,467 (Hastings). This method was directed at the turning of buttons from blanks or slabs of vegetable ivory nuts, though it claimed to be applicable to other materials. The process is begun by constructing a rough doublet button blank, severing it by a transverse cut and subsequently finishing the rough halves. The disclosure does not include joining the finished halves, but rather addresses the formation of two buttons from one blank or one ivory nut.

More recently, U.S. Pat. No. 2,306,587 (Broderson) described a process for making buttons from plastic which exhibited a decorative natural appearance. The invention disclosed the use of two or more differently colored sheets of plastic substance bonded together to produce the button blanks. The mating surfaces of the laminated sheets may be corrugated or roughened to facilitate the permanent bonding and joined with a single application of heat and pressure. Following the fabrication of the laminated sheets, the button blanks may be cut out and machined at different angles. This finishing process produces ornamental buttons which appear to have come from natural sources such as bone or shell, yet did not require the use of liquid coloring materials or individual molding.

Another process for fabricating buttons having variegated color or shaded color effects was revealed in U.S. Pat. No. 2,602,192 (Silberkraus). In this method, the variegated effects were obtained by forming the blank using granular or powdered thermosetting materials of disparate colors. While such a process does require individual molding, there is no use of liquid coloring materials and does not require the removal of large amounts of thermosetting material as would occur with blanks produced from a single sheet. Further the use of granular material appears to form blanks which are less susceptible to imperfections which would cause them to crack or split upon finishing. The patent also indicates that the pattern of variegated color may be modified by varying the granular size of the different materials.

SUMMARY OF THE INVENTION

It is an object of this invention to provide a mechanically strong and durable button-like reflector of visible light which can be attached to animal collars in order to make them more aesthetically pleasing and more visible in darkness to oncoming vehicles with headlights.

It is a further object of this invention to provide such reflectors that can also be attached to garments in general in order to make the wearers of the garments also more aesthetically pleasing and more visible in darkness to oncoming vehicles with headlights.

It is a further object of this invention to provide the beneficial reflective properties of dichroic glass in a lightweight, durable form at a relatively low cost. Hopefully the striking aesthetic properties of the dichroic glass, combined with the ability to incorporate selected designs, will dramatically increase the use of safety reflectors on garments and pet collars.

A further object of this invention is the introduction of a process for reflective button formation involving at least two materials, which does not require a substantial amount of post production finishing or the introduction of complicated pre-fabrication steps.

A further object for this invention is the manufacture of reflective buttons at a relatively low cost without the use of expensive, high pressure molds. Yet the most important object of this invention involves the superior reflecting properties of the dichroic glass itself and its use as a safety reflector.

The aforesaid advantages, attributes and objects, and others which will become apparent upon reading of this specification, are accomplished by a process for making a light reflective, decorative button comprising the steps: (1) creating a first stratum having a light reflective area in a desired size and shape on at least one face of the stratum, (2) creating a second stratum from material fusibly compatible under heat with the first stratum and large enough to encompass the first stratum, (3) placing the first stratum upon the second stratum forming a stack with the light reflective area at the top of the stack, (4) applying heat to the stack until the strata fuse into a coherent mass, the light reflective area being made of a material that is substantially unaffected by the applied heat, and (5) annealing the mass for strength. The process can comprise further steps to be taken prior to applying heat to the stack, these further steps being to create at least one other stratum from material fusibly compatible under heat with the second stratum to add thickness and strength to the button, and to place the additional stratum(s) at the bottom of the stack. preferably the strata are all glass sheets cut to desired sizes and shapes, but it may be possible to use other materials, such as plastic. Preferably the second stratum is a disc of dark colored glass to emphasize the lightness of the reflective area, and the third and subsequent strata are matching discs of light or dark colors. Preferably the heating is gradual and done in a kiln, and the complex is allowed to anneal through a controlled slow reduction of the temperature to avoid thermal shock and possible fracturing. While the base of the buttons are preferably flat, they may be shaped or embedded with objects, depending on the intended use of the buttons. The resulting buttons have a characteristic dome shape with a height that may be extended by adding additional strata, which may be clear or colored. Though preferably a few centimeters, the actual size of the buttons is limited only by the physical properties of the material. This invention can further comprise the step of mounting the buttons at locations at which the buttons can reflect at substantially 180° a significant portion of incident light.

BRIEF DESCRIPTION OF THE DRAWINGS

FIG. 1 is a perspective view of a finished button according to this invention illustrating the disposition of a light reflective dorsal area.

FIG. 2 is an elevational view of an arrangement of strata for a first process according to this invention.

FIG. 3 is an elevational view of an arrangement of strata for an alternative process according to this invention.

FIG. 4 is an elevational view of a dome button formed according to this invention.

FIG. 5 is a plan view of the dome button of FIG. 4.

FIG. 6 is a plan view of an animal collar bearing a plurality of light reflective buttons according to this invention.

FIG. 7 is a side elevational view of a single stratum having a top surface coated with anisotropic crystal material prior to heating.

FIG. 8 is a partial cross-sectional view from a side of a decorative reflector resulting from proper heating of the single stratum of FIG. 7.

FIG. 9 is a plan view of the reflector of FIG. 8.

FIG. 10 is a plan view of a stack of rectangular strata disposed within a rectangular mold.

FIG. 11 is a cross-sectional view taken along lines 11—11 of FIG. 10.

FIG. 12 is a cross-sectional view taken along the same line but after the strata have been heated and fused.

FIG. 13 is a cross-sectional view taken along a median of a mold having a spherically convex floor atop which is resting on an unheated stratum.

FIG. 14 is a cross-sectional view taken along a median of the mold and stratum of FIG. 13 after the stratum has been heated.

DESCRIPTION OF THE PREFERRED EMBODIMENT

Optically, crystalline solids may be categorized according to two major classes based on their interaction with light. Isotropic crystals have a highly symmetrical lattice arrangement which tends to absorb light uniformly. A light source from within an isotropic crystal would spread out in a spherical wavefront. Conversely, an anisotropic crystal has a repeating array of atoms which are not symmetrical, and therefore manifests discrete optical characteristics in different directions. In an anisotropic crystal the light will be absorbed selectively and unabsorbed light reflected, based on the light's angle of incidence. These discrete absorptions give the crystal different colors based on reflected light when viewed from diverse angles. This general effect is known as pleochroism.

Dichroism is the same general effect, but is a reflection of only two colors depending on the orientation of the crystal. Dichroic materials are anisotropic crystals that exhibit this property and may be natural or synthetic. The most popular use for dichroic materials is to convert unpolarized light into a linearly polarized form. In addition they have long been used by the aerospace and optical industries as an interference coating and to reduce reflections. The dichroic material is usually deposited as a thin film on a selected matrix and often appears metallic. Depending on its purpose and molecular composition, the film may be almost invisible or highly reflective. Similarly, the matrix may be any one of a number of different materials, including glass.

Unlike the crystals of the dichroic material, silica glass exists in a non-crystalline amorphous state. As such, it does not possess a single melting point but rather softens gradually or liquefies as it is heated. This decrease in viscosity takes place over a wide temperature range which is determined by the molecular composition of the glass. Through the addition of impurities such as sodium, the liquefaction point may be modified so that different glasses will liquefy at different points.

By taking advantage of this gradual softening, it is possible to fuse two or more separate strata of glass having the same compatibility rating by heating them together. Glass fusion techniques using common commercial glass material involves heating the glass strata to a temperature within the range of 1400 and 1650 degrees Fahrenheit, generally 1400–1450 for partial fusion and generally 1550–1650 for total fusion. The liquefaction of the material may be controlled through the absolute temperature reached and the period it is maintained. Following the reconfiguration of the heated glass, the newly shaped mass is allowed to cool. It is critical that the glass strata being joined possess the same thermodynamic properties which are represented by the use of a figure known as a compatibility rating. Attempting to fuse two stratum of glass with more than one point difference in compatibility rating makes them susceptible to fracturing as they cool and contract at different rates.

Referring to FIGS. 1, 4, and 5, a dome-like button manufactured by a process according to this invention is illustrated. The button 2 is made from a plurality of fused glass strata and has a dorsal (at or about the top of the dome) light reflective area 4 comprised of a plane of pleochroic or dichroic material which serves to reflect visible light of certain hues or colors and impart an aesthetically pleasing appearance to the button. In this particular embodiment, the reflective area as viewed from above the dome is rectangular in shape (see FIG. 5), but it should be understood that a reflective area is not limited to that particular shape. By following the procedures set forth herein, the area can be any conceivable shape. It is preferable that the pleochroic or dichroic plane be of a kind that reflects only that portion of incident light that contains hues and colors high in lightness in order to make the buttons as reflective as possible, particularly in a low light or darkness background.

As an example, a plane of dichroic material can exhibit a metallic finish of blue or green hues of high lightness, when illuminated by a light source, depending on the angle of viewing.

Referring to FIG. 2, a step in the process of manufacturing reflective glass buttons in a dome shape having a dorsal pleochroic or dichroic plane is creating a first stratum 8 of glass having a pleochroic or dichroic face in a desired shape and size. This can be done by obtaining a commercially available planar sheet of glass having a face that has dichroic properties, commonly called "dichroic glass," and cutting from the sheet a piece in the desired shape and size. Such dichroic glass is produced by several glass manufacturers (e.g. Bullseye and Wasser) through a process involving the deposition of thin films of dichroic material on sheets of glass. A further step in the process is creating a second stratum 10 of glass with a compatibility rating that substantially matches the compatibility rating of the first stratum. This can be done by cutting from a sheet of commercially available glass a piece in a desired shape and size, preferably in the shape of a disc as illustrated in the drawings. These steps are interchangeably the first and second steps of the process.

As an example, the dichroic glass stratum, the first stratum, can be rectangular with a length of approximately 1.0 centimeter and a width of approximately 0.5 centimeters and can have a compatibility rating of 90 and be ⅛ inch thick. The second stratum can be a 1.5 diameter disc of dark colored glass having a compatibility rating of 90 and a thickness of ¹⁄₁₆ to ⅛ inch.

It is also contemplated that the second stratum may be clear, light colored or composed of other materials such as plastics or polymers.

Referring again to FIG. 2, illustrated is a third step in the process, which comprises the placement, and preferably centering, of the first stratum 8 upon the second stratum 10 with the pleochroic or dichroic face up to form a stack 6A. The second stratum may be of indeterminate shape, and its size and shape are preferably selected so as to encompass the first stratum when heated and is limited only by the physical constraints of the material.

The stack 6A is then heated, e.g. in a kiln, until the strata fuse into one dome-shaped coherent mass. For the commercially available glass described above used as the strata, fusion is accomplished by increasing the temperature at a rate not exceeding 200 degrees Fahrenheit every twenty minutes. This rate is maintained until the temperature reaches 750 degrees Fahrenheit, at which time the kiln is allowed to heat as quickly as possible to a final temperature of 1550 degrees Fahrenheit. The temperature is maintained until the strata of glass are fused. While this period may be determined experimentally, in one preferred embodiment of the process the buttons are checked visually to determine when fusion has occurred.

While fusing, the stack of glass will naturally tend to bead due to cohesion forces as it seeks to minimize the amount of surface area required to enclose its volume. However, gravity will flatten the bead, creating the flat-based dome shape. During partial fusion, the strata will liquify to the extent that the edges will round and smooth out, also creating a general dome shape.

It is significant that while the heating causes the pleochroic or dichroic plane's original matrix, i.e. the first stratum, and the second stratum to liquify to an extent necessary to fuse, totally or partially, the pleochroic or dichroic material, which is crystalline in structure, does not melt and so the pleochroic or dichroic plane remains intact and substantially holds its original shape except for some conformance to the curvature of the dome. It appears that the crystalline plane actually floats on the liquified strata because in the resultant button the plane remains at or very near the surface at the top of the dome.

Referring to FIG. 3, an alternative process can comprise the steps of creating a first stratum 12 as described above, having a pleochroic or dichroic face, creating a second stratum 14 as described above, and creating a third stratum 16 preferably of glass with a compatibility rating matching the second stratum but which may be of other materials, such as high temperature plastic. The third stratum can also be created by cutting a piece from a sheet of commercially available glass in a desired shape and size. Both the color and thickness of the third stratum are indeterminate and may be selected to enhance the utility and aesthetic properties of the button. The plan profile of the third stratum preferably matches that of the second stratum. In the above described example, the third stratum can be a disc of clear glass having a compatibility rating of 90 with a diameter of 1.5 centimeters and a thickness of approximately ⅛ inch. Further steps comprise placing, and preferably centering, the first stratum 12 upon the second stratum 14, with the pleochroic or dichroic face up, and placing, and preferably centering, the second stratum upon the third stratum 16 to form a stack 6B. The third stratum is added to increase the mechanical strength or thickness of the resulting button. The stack is then heated until the strata fuse into one dome-shaped coherent mass, as described above for the two strata stack.

Upon cooling, the button retains the dome shape and flat base as illustrated in FIG. 4. In a preferred process the kiln is turned off and the temperature is lowered to 950 degrees Fahrenheit by flash venting. This temperature is then maintained for a period sufficient to properly anneal the glass. The period is substantially 10 minutes for each stratum of glass, or thirty minutes total when a third stratum is used. The buttons are then gradually cooled to a temperature of 150 degrees Fahrenheit in the closed kiln. At this point the kiln is opened and the buttons are allowed to come to room temperature.

While the aforementioned methods may be preferred, other methods of heating and cooling fused glass are well known in the art and contemplated by this invention. For example, partial fusion may be employed in which the pleochroic or dichroic glass piece merely sinks into the substrate and only partially fuses with the substrate. For the materials described above, this would occur at about 1400–1450 degrees Fahrenheit.

The precise curvature of the dome is determined by the physical properties of the glass strata and their reaction to the gravity, and whether total or partial fusion is used. This curvature may be preferentially modified by varying the shape and thickness of the glass strata or altering their composition. The resulting button is solid, with a domed reflective surface and a flat base, as seen in the top view of FIG. 5. Preferably, the dome is formed of glass, giving it a durable finish, and has a dark background to enhance the reflectivity of the dichroic material.

One example employing a third strata of 0.2 centimeters, produces a dome with a height of 0.5 centimeters and a diameter of 1.5 centimeters.

As previously touched upon, the first strata of both processes described above can be made with reflective areas in any conceivable shape, such as stars, rectangles, and circles. Additionally, dichroic glass is available in a number of different hues and colors and the buttons may be manufactured to reflect this diversity.

Referring to FIGS. 7–9, a single disk-shaped stratum 30 has a coating 32 of anisotropic crystal material on its surface. The stratum can be plastic or glass. To make a decorative light reflector according to this invention, the stratum is heated until the upper edge of the rim 34 slumps, the amount of heat applied being sufficient to slump the edge a desired amount without melting the anisotropic coating. The slumping of the upper rim edge causes a rounding of the margin of the anisotropic coating. This effectively increases the angular range, or aperture, of light reflection. This effect can also be achieved with more than one stratum.

Referring to FIGS. 10–12, the process described above in connection with FIGS. 1–5 can also be applied to strata disposed within a mold. Illustrated is a mold 36 in the form of a rectangular container. Within the container is a rectangular base stratum 38 of glass or plastic, and atop the base stratum is a smaller rectangular stratum 40, again either glass or plastic, having an upper surface coated with anisotropic crystal material (not shown). FIG. 12 illustrates the strata fused 42 after heating as described above. The mold confines the flow of the strata during the heating and so the resulting reflector maintains the broad profile of the mold. It can be seen that this process can be applied using basically any form of mold.

Referring to FIGS. 13 and 14, another mold 44 having sidewalls and a spherically convex floor 46 is illustrated. In FIG. 13, the mold contains a stratum 48 of glass or plastic having on its upper surface a coating 50 of anisotropic crystal. After the stratum has been heated, as illustrated in FIG. 14, the top surface of the stratum has a convex form similar to the form of the stratum of FIG. 8, and therefore has a similar advantage in that the aperture of light reflection has been increased. Also, the base of the stratum has a convex form to allow it to be mounted on a similarly rounded surface. In this way the reflective pieces can be made to conform to non-flat surfaces on which they are to be mounted. It should be noted that the molds illustrated in FIGS. 10–14 could be halves of a compression mold which may need to be used when the stratum is plastic.

A significant advantage of reflective items made according to this invention is that the anisotropic coating can be highly reflective of beams of light, such as a vehicle's headlights. While the anisotropic material has aesthetically pleasing properties in ordinary room light and sunlight, it functions as a very effective reflector of beams of light directed at it.

It should be realized that the embodiments and methods described above with reference to FIGS. 1–6, could involve strata of plastic as well as glass. Moreover it should be realized that the use of the term "button" herein should not be interpreted to limit the size and shape of the reflectors of this invention.

From the foregoing it will be appreciated that this invention provides efficient, low cost processes for producing an aesthetically pleasing button with high reflectivity characteristics. As such, the resulting buttons are suitable for mounting on garments and other items worn by persons and animals as reflectors. One such application is illustrated in FIG. 6. An animal collar 18 has a plurality of reflective buttons 20 made according to this invention attached with the reflective areas of the buttons facing away from the collar. The buttons can be mounted by any suitable means, such as by an adhesive bonding the flat base of the buttons to the collar, or by conventionally available circular bezels more commonly used to clamp costume jewelry stones to cloth. Moreover, the buttons can be manufactured with an integral means of attachment. Examples of other items upon which the buttons may be mounted both for aesthetic and safety reasons include without limitation articles of clothing, jogging shoes, Halloween costumes, purses, children's toys, rain gear, and bicycles.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

I claim:

1. A process for making a decorative light reflector comprising the steps:

(a) creating a first stratum having an area bearing a light reflective anisotropic crystal material in a desired size and shape on at least one face of the stratum, (b) creating a second stratum from material fusibly compatible under heat with the first stratum and large enough to encompass the first stratum, (c) placing the first stratum upon the second stratum forming a stack with the light reflective area at the top of the stack, and (d) applying heat to the stack until the strata fuse into a coherent mass, the light reflective area being made of a material that is substantially unaffected by the applied heat.

2. The process according to claim 1 further comprising steps as follows taken prior to the step of applying heat to the stack:

(a) creating at least one other stratum from material fusibly compatible under heat with the second stratum to add thickness and strength to the light reflector, and (b) placing said at least one other stratum at the bottom of said stack.

3. The process according to claim 2 wherein the light reflective area comprises a plane of pleochroic material.

4. The process according to claim 2 wherein the light reflective area comprises a plane of dichroic material.

5. The process according to claim 2 wherein heat is applied to the stack until it forms the general shape of a flat-based dome.

6. The process according to claim 1 wherein the light reflective area comprises a plane of pleochroic material.

7. The process according to claim 1 wherein the light reflective area comprises a plane of dichroic material.

8. The process according to claim 1 wherein heat is applied to the stack until it forms the general shape of a flat-based dome.

9. A process for making a decorative light reflector comprising the steps:

(a) creating a first stratum of glass having an area bearing a light reflective anisotropic crystal material in a desired size and shape on at least one face of the stratum, (b) creating a second stratum of glass fusibly compatible under heat with the first stratum and large enough to encompass the first stratum, (c) placing the first stratum upon the second stratum forming a stack with the light reflective area at the top of the stack, and (d) applying heat to the stack until the strata fuse into a coherent mass, the light reflective area being made of material substantially unaffected by the applied heat.

10. The process according to claim 9 further comprising steps as follows taken prior to the step of applying heat to the stack:

(a) creating at least one other stratum of glass fusibly compatible under heat with the second stratum to add thickness and strength to the light reflector, and (b) placing said at least one other stratum at the bottom of said stack.

11. The process according to claim 10 wherein the light reflective area comprises a plane of pleochroic material.

12. The process according to claim 10 wherein the light reflective area comprises a plane of dichroic material.

13. The process according to claim 10 wherein heat is applied to the stack until it forms the general shape of a flat-based dome.

14. The process according to claim 9 wherein the light reflective area comprises a plane of pleochroic material.

15. The process according to claim 9 wherein the light reflective area comprises a plane of dichroic material.

16. The process according to claim 9 wherein heat is applied to the stack until it forms the general shape of a flat-based dome.

17. A decorative light reflector comprising a plurality of strata fused into a convex top shape, and an area bearing a light reflective anisotropic crystal material facing outward from the top.

18. The reflector according to claim 17 wherein the light reflective area comprises a plane of pleochroic material.

19. The reflector of claim 17 wherein the light reflective area comprises a plane of dichroic material.

20. A process for making a decorative light reflector comprising the steps:

(a) creating a stratum having a light reflective anisotropic crystal area in a desired size and shape on at least one face of the stratum, and (b) applying heat to the stratum sufficient to round the edges of said stratum face but insufficient to affect the light reflective properties of the crystal area.

21. The process according to claim 20 further comprising the steps of placing the stratum in a mold prior to applying heat, and applying heat sufficient to cause the stratum to assume the shape of the mold but insufficient to affect the light reflective properties of the crystal area.

22. A decorative light reflector comprising a stratum heated to have a convex top shape, and an area bearing a light reflective anisotropic crystal material facing outward from the top.

* * * * *